Figure 1:
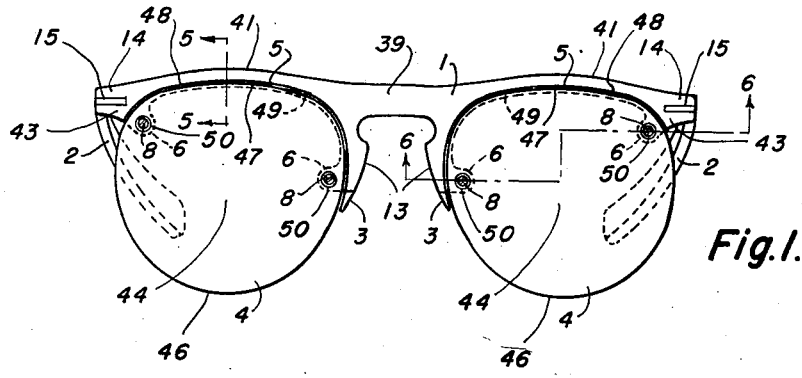

May 8, 1951 E. D. DITTO 2,552,411
OPHTHALMIC MOUNTING
Filed June 2, 1949 2 Sheets-Sheet 1

Inventor
Eugene D. Ditto
by Riues and Riues
Attorneys

May 8, 1951　　　　　E. D. DITTO　　　　　2,552,411
OPHTHALMIC MOUNTING
Filed June 2, 1949　　　　　　　　　　　　　2 Sheets-Sheet 2

Inventor
Eugene D. Ditto
by Rines and Rines
Attorneys

Patented May 8, 1951

2,552,411

UNITED STATES PATENT OFFICE 2,552,411

OPHTHALMIC MOUNTING

Eugene Dennis Ditto, Brookline, Mass., assignor to Marine Optical Manufacturing Co., Boston, Mass., a corporation of Massachusetts Application June 2, 1949, Serial No. 96,698

2 Claims. (Cl. 88—41)

The present invention relates to ophthalmic mountings, and more particularly to spectacles.

Ophthalmic mountings of the rimless type have great appeal, but they are subject to the drawback that the lenses break easily, when they fall. Ophthalmic mountings of the part-rim or semi-frame or semi-rimless type have therefore been proposed, in which parts only of the lenses are without rims. Some of these proposals have solved the problem of breakage in large part, but they have been attended by other disadvantages. The lower portions of some of these mountings, for example, have been cut away, so as to expose the lower portions of the lenses, but it has been difficult to hold the lenses in place. To meet this difficulty, supporting-wire or other thin semi-rims have been inserted under the lenses, but these have involved complexities of construction. Other proposals have been ugly in appearance. Still others of these proposals have not been satisfactory for other reasons.

In a copending application, Serial No. 8,607, filed February 16, 1948, there are disclosed new and improved spectacles of the semi-frame type that, though closely resembling in appearance spectacles of the rimless type, are so rugged as almost completely to assure that the lenses shall not break when they fall, and that are nevertheless simple in construction. The spectacle front is provided with a bridge member in one piece with two outwardly extending bars terminating at the lower ends in nose-guard supports, and provided with lens seats shaped to conform to the upper edges and portions of the side edges of the lenses. The lower surfaces of the lenses are thus exposed to provide the part-rim or semi-frame or semi-rimless effect.

It is found, however, in practice, that the ruggedness of these spectacles is so great, and the lenses are consequently held in their lens seats so firmly, that there is a tendency for the lenses to become broken in response to accidental or other flexing of the spectacles, such as may occur during the insertion of the lenses in the lens seats, angling, fitting and shock.

In the attempt to reduce breakage of the lenses in semi-rimless spectacles of this character, it has been proposed to provide lens seats that shall not bind against both surfaces of the lenses. According to this proposal, the lens was to be held in a lens seat that is L-shaped in cross-section by screws extending through alined perforations in the lens and one of the arms of the L-shaped lens seat. This does not, however, eliminate the breakage. On the hypothesis that this breakage was perhaps caused by the fact that pressure was exerted at directly opposite points of the lens by the head of the screw and the said arm of the lens seat, a proposal was thereupon made to mount a resilient washer about each screw between the lens and the head of the screw. The lens breakage, however, continued.

The source of the breakage has now been discovered to reside in the fact that, during the flexing of the spectacles, the said arm of the L-shaped lens seat presses against the surface of the lens that contacts therewith. The glass of the lens is too fragile and brittle to resist this pressure without breaking.

According to the present invention, therefore, the problem has been solved by keeping the lens out of contact with the said arm of the lens seat. According to the preferred embodiment of the invention that is illustrated and described herein, this may be effected by mounting a washer about each screw between the lens and the said arm of the lens seat. Even under such circumstances, the lens may still sometimes break if the washer is too rigid. All breakage, for all practical purposes, may, however, be eliminated by constituting the washer of suitable resilient material.

Figure 2:
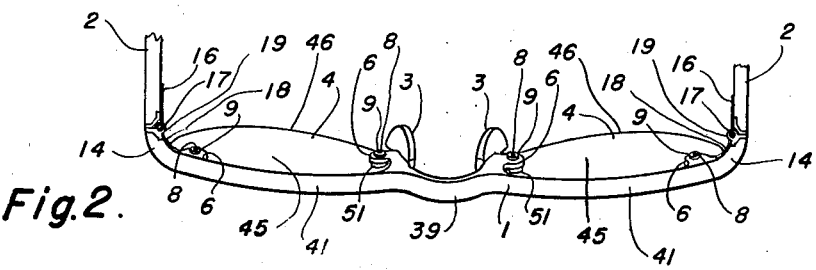
Figure 3:
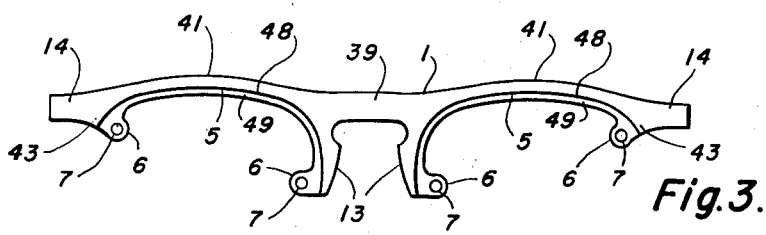
Figure 4:
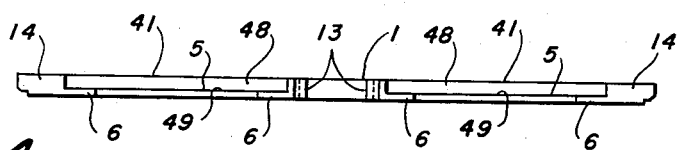
Figure 5:
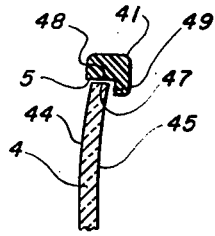
Figure 6:
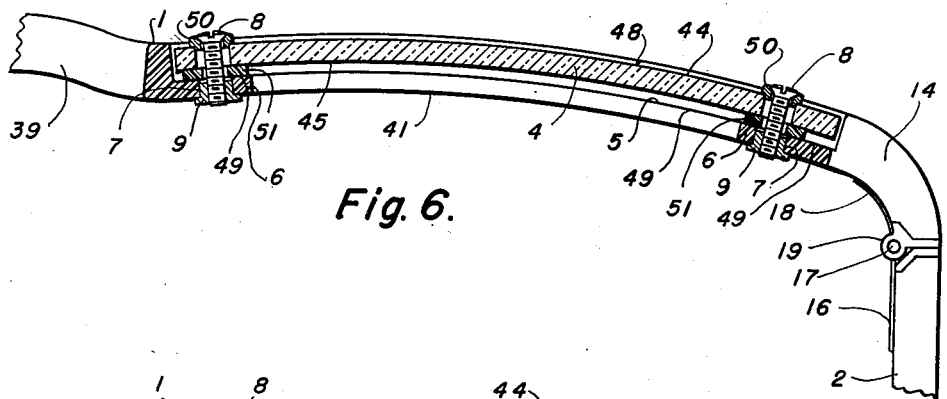
Figure 7:
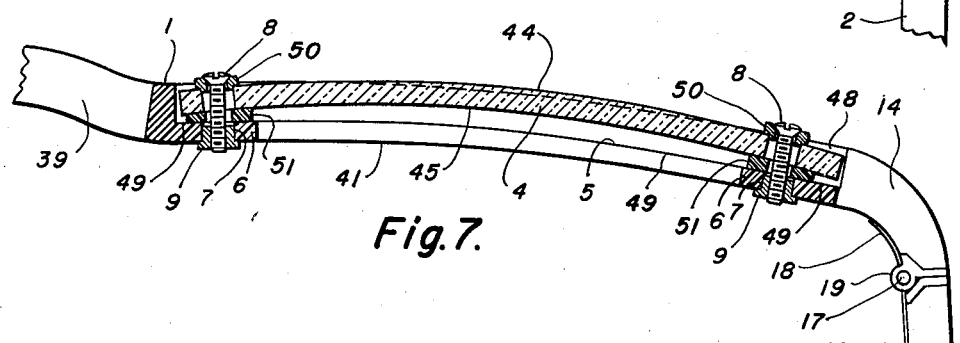
Figure 8:
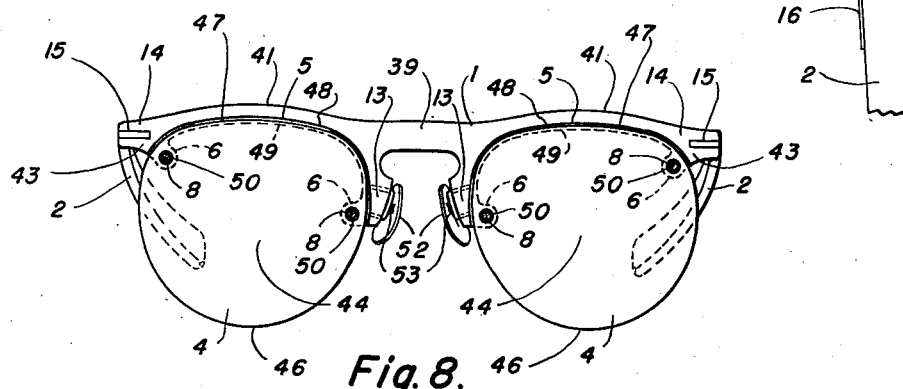
Figure 9:
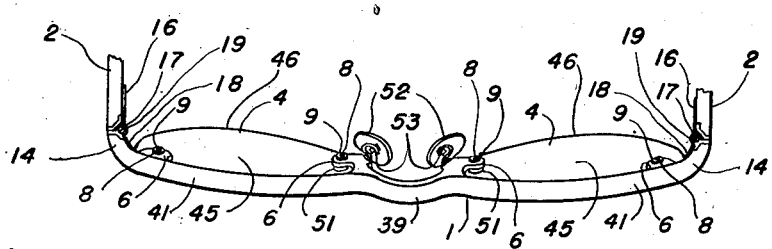
Figure 10:
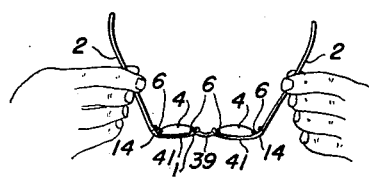

The invention will now be described more fully in connection with the accompanying drawings, in which Fig. 1 is a front elevation of a pair of spectacles constructed according to a preferred embodiment of the present invention, showing also the lenses in place; Fig. 2 is a plan of the same; Fig. 3 is a front elevation similar to Fig. 1, illustrating a blank formed out of a sheet of suitable plastic or other stock from which the front of the spectacles shown in Figs. 1 and 2 may be manufactured; Fig. 4 is an underside plan of the same; Figs. 5 and 6 are sections, upon larger scales, taken, respectively, upon the lines 5—5 and 6—6 of Fig. 1, looking in the directions of the respective arrows; Fig. 7 is a section similar to Fig. 6, with the parts in relatively different positions; Fig. 8 is a front elevation similar to Fig. 1 of a modification; Fig. 9 is a plan similar to Fig. 2 of the modification shown in Fig. 8; and Fig. 10 is a perspective, upon a smaller scale, illustrating the flexing of the spectacles of the present invention, which may be effected without breakage of the lenses.

The spectacle front of the present invention may be manufactured by first forming a suitable blank 1 out of non-metal sheet material. The blank 1 may, of course, be manufactured in other ways also, as by molding. However manufactured, the blank 1 comprises a unitary bridge member 39 and two lens-holding members. Each lens-holding member is shown comprising a depending nose-supporting arm 13 and outwardly extending bars 41, disposed on opposite sides of the bridge member 39. The bars 41 may be disposed approximately in alinement with the bridge member 39, or they may be raised somewhat above the bridge member 39, as shown, with consequent slight inclination to the horizontal.

The nose guard may be integral with the nose-guard-supporting arm 13 by which it is supported, as shown at 3 in Figs. 1 to 7, or, as shown at 52 in Figs. 8 and 9, it may be rockably mounted thereon, as illustrated at 53. Each nose-guard-supporting arm 13 terminates at its lower end in a lens strap 6 that extends outward away from the corresponding nose-guard-supporting arm.

Each bar 41 terminates at its outer end in a temple-connecting end piece 14, from which depends a curved arm 43, terminating in a lens strap 6, extending inward toward the lens strap 6 of the corresponding nose-guard-supporting arm 13. Each lens strap 6 is provided with an ear, shown perforated at 7.

Each end piece 14 may be disposed in the plane of the bar 41 at the outer end of which it is disposed. It is preferred, however, to curve the end pieces 14, as by suitable bending under pressure and heat, out of the planes of the respective bars 41, and downward, at a suitable incline, as shown.

The material of the blank 1 may be constituted of the nitrocellulose product known as "Zylonite" or "Celluloid," a compound of pyroxylin, camphor and alcohol. It may, however, be constituted also of any other suitable plastic, such as nylon, or a plasticized vinyl resin polymer obtained, for example, by polymerizing one or more vinyl derivatives. For moulding, cellulose acetate may be employed, though this material may be used in sheet form also. The attractiveness of the spectacles may be increased by having the non-metal material transparent, and either colored or uncolored.

The lens-holding members of each blank 1 are rabbeted continuously throughout their extent, to provide each of them with a lens seat 5 extending from the lens strap 6 of its depending arm 13 to the lens strap 6 of its end piece 14. The lens seats 5 are shown L-shaped in cross-section, each provided with a horizontally disposed arm 48 at the upper edge of the spectacle front and a vertically disposed arm 49 at the rear of the spectacle front. The lenses 4 are seated in the respective lens seats, with their respective upper edges 47 and their adjacently disposed side edges disposed adjacent to but spaced from, the respective upper and adjacently disposed side edges of the arms 48 of the lens seats, and with the adjacently disposed upper marginal portions of their respective rear faces 45 disposed adjacent to the respective vertically disposed arms 49 of the lens seats. The shape of the upper edges 47 of the lenses 4 is therefore fixed by the shape of the lens seat 5, shown as more or less elliptical, but the lower edges 46 of the lenses 4, since they are exposed, may assume a variety of shapes.

Temples 2 are shown pivoted to the end pieces 14 of the spectacle front by means of metal hinges. Each hinge comprises metal members 16 and 18, pivoted together at 17, the former for securing to one of the temples 2 and the latter for securing to one of the end pieces 14. The hinge members 16 and 18 may be secured to the respective temples 2 and the rim faces of the respective end pieces 14 in any desired way. As described in the said application, for example, they may be secured with the aid of rivet pins, not shown, integral with elongated curved metal members 15 set flush into recesses in the material of the front and the temples.

In unitary one-piece spectacle fronts of the semi-rimless type of this character, the lenses 4 have been held by screws or posts extending through the lenses and cooperating parts of the front at two points; near the end pieces 14, and near the nose guards 3 or 52. As illustrated more particularly in Figs. 6 and 7, a post 8, shown as a headed screw, may extend through the perforation 7 in the ear 6 of each lens strap, an alined perforation in the lens 4, and a tubular nut 9 provided with a cylindrical portion extending into the perforation in the lens 4 and an enlarged portion that engages the rear surface of the corresponding ear 6. The screws 8 thus cooperate with the lens straps 6 and the nuts 9 to hold the lenses 4 in their lens seats 5 with the upper portions of their rear surfaces 45 disposed adjacent to the vertically disposed arms 49 of the respective lens seats 5, their adjacently disposed upper edges 47 disposed adjacent to the horizontally disposed arms 48 of the lens seats 5, and with their lower surfaces 46 exposed.

During the flexing of the spectacles, caused by separation of the temples 2, as illustrated in Fig. 10, the temple-connecting end pieces 14 are moved outward, from the position of Fig. 6 to that of Fig. 7. This causes the portion of the vertically disposed arm 49 of the lens seat 5 that is disposed near the end piece 14 to become actuated toward the adjacently disposed edge portion of the rear face 45 of the lens 4 seated therein. Similar action takes place near the bridge 39. It has been discovered that it is the resulting pressure upon the fragile and brittle glass of the lens 4, caused by contact of the upper marginal portion of the rear face 45 of the lens 4 with the vertically disposed arm 49 of the lens seat 5 in which the lens 4 is seated, that has heretofore produced breakage of the lens 4.

To prevent such breakage, in accordance with the present invention, the rear face 45 of each lens 4 is maintained out of contact with the vertically disposed arm 49 of the lens seat 5 in which it is seated by interposing a pad-like washer 51 about each screw 8 between the rear face 45 of each lens 4 and the vertically disposed arm 49 of the corresponding lens seat 5. During flexing of the temples 2, as illustrated in Figs. 7 and 10, therefore, the vertically disposed arm 49 of the lens seat 5 approaches the rear face 45 of the lens 4, as is demonstrated by the smaller space shown between them at the extreme left and the extreme right in Fig. 7 than in Fig. 6. According to the present invention, however, the face 45 does not actually contact with the vertically disposed arm 49 of the lens seat 5; and, as shown clearly on Figs. 1 and 8, and upon a larger scale in Figs. 5, 6 and 7, the edge 47 is likewise spaced from the adjacently disposed arm 48. Since there is no contact, there is no pressure against the fragile, brittle glass of the lens 4, and therefore no breakage. The pad-like washers 51 serve also to compensate for varying concavity of the lenses 4, they cushion against the strain on the lenses 4, and they absorb shock.

As hard washers may themselves introduce pressure and consequent breakage, however, it is preferred to constitute the washers of resilient material. This introduces even less tendency to breakage, because the lenses 4 are held less firmly by the screws 8 at the places where they contact with the washers 51 than would be the case with rigid washers. As rubber deteriorates, moreover, it is preferred to make the pad-like washers of a suitable resilient plasticized plastic, like vinyl chloride.

To prevent further sources of breakage, such as might be caused by pressure of the inner face of the head of the screw 8 against the front face 44 of the lens 4, an additional washer 50, resilient or non-resilient, may be interposed between these faces, as well as is also illustrated in Figs. 6 and 7. Toward the attainment of a similar end, the perforations of the lenses 4 are shown wider than the thickness of the screws 8, in order to prevent binding of the screws 8 against the lenses 4.

Modifications will occur to persons skilled in the art, and all such are considered to fall within the spirit and scope of the invention as defined in the appended claims.

What is claimed is:

1. A spectacle front provided with a bridge member and two lens-holding members each comprising a depending arm terminating at its lower end in a nose-guard support and an outwardly extending bar terminating at its outer end in a temple-connecting end piece, means at the rear of each temple-connecting end piece for pivoting a temple thereto, a nose guard carried by each nose-guard support, each lens-holding member being provided with a lens seat L-shaped in cross-section extending continuously throughout its extent from its nose-guard support to its temple-connecting end piece and with a lens strap at each end of the lens seat, the bridge member and the lens-holding members with their nose-guard supports, their temple-connecting end pieces and their lens straps being all constituted wholly of a sheet of flexible non-metal material and being all continuously connected together integrally into a unitary one-piece non-metal spectacle front of the semi-rimless type, one of the arms of each lens seat being disposed at the upper edge of the spectacle front and being provided with an upper edge and adjacently disposed side edges, the other arm of each lens seat being disposed at the rear of the spectacle front, lenses being seated in the respective lens seats having respective upper and adjacently disposed side edges disposed adjacent to, but spaced from, the respective upper and adjacently disposed side edges of the said one arms of the respective lens seats, with the adjacently disposed upper marginal portions of their respective rear surfaces disposed adjacent to the respective said other arms of the respective lens seats, and with the lower edges of the lenses exposed, and means comprising resilient washers mounted between the lenses and the lens straps for holding the lenses in the respective lens seats with the said upper marginal portions of the rear surfaces of the lenses resiliently separated from the respective said other arms of the respective lens seats in which the lenses are respectively seated, whereby contact between the lens seats and the edges of the lenses is prevented during the flexing of the spectacle front.

2. A spectacle front provided with a bridge member and two lens-holding members each comprising a depending arm terminating at its lower end in a nose-guard support and an outwardly extending bar terminating at its outer end in a temple-connecting end piece, means at the rear of each temple-connecting end piece for pivoting a temple thereto, a nose guard carried by each nose-guard support, each lens-holding member being provided with a lens seat L-shaped in cross-section extending continuously throughout its extent from its nose-guard support to its temple-connecting end piece and with a lens strap having a perforated ear at each end of the lens seat, the bridge member and the lens-holding members with their nose-guard supports, their temple-connecting end pieces and their lens straps being all constituted wholly of a sheet of flexible non-metal material and being all continuously connected together integrally into a unitary one-piece non-metal spectacle front of the semi-rimless type, one of the arms of each lens seat being disposed at the upper edge of the spectacle front and being provided with an upper edge and adjacently disposed side edges, the other arm of each lens seat being disposed at the rear of the spectacle front, perforated lenses being seated in the respective lens seats having respective upper and adjacently disposed side edges disposed adjacent to, but spaced from, the respective upper and adjacently disposed side edges of the said one arms of the respective lens seats, with the adjacently disposed upper marginal portions of their respective rear surfaces disposed adjacent to the respective said other arms of the respective lens seats, with the lower edges of the lenses exposed, and with the perforations of the lenses alined with the perforations in the respective lens seats in which the lenses are respectively seated, the lenses being adapted to be held in the respective lens seats by means of headed screws extending through the alined perforations in the ears and the lenses and nuts threaded upon the screws, and resilient washers mounted about the respective screws between the lenses and the lens straps in order resiliently to separate the said upper marginal portions of the rear surfaces of the lenses from the respective said other arms of the respective lens seats in which the lenses are respectively seated, whereby contact between the lens seats and the edges of the lenses is prevented during the flexing of the spectacle front.

EUGENE DENNIS DITTO.

REFERENCES CITED

The following references are of record in the file of this patent:

UNITED STATES PATENTS

| Number | Name | Date |
| --- | --- | --- |
| 1,918,998 | Wells | July 18, 1933 |
| 2,180,820 | Gaspari | Nov. 21, 1939 |
| 2,208,356 | Bosworth | July 16, 1940 |
| 2,243,681 | Pomeranz | May 27, 1941 |
| 2,331,021 | Galiani | Oct. 5, 1943 |
| 2,372,059 | Cook | Mar. 20, 1945 |
| 2,509,655 | Soden | May 30, 1950 |

FOREIGN PATENTS

| Number | Country | Date |
| --- | --- | --- |
| 574,555 | Great Britain | Jan. 10, 1946 |
| 608,081 | Great Britain | Sept. 8, 1948 |